United States Patent
Wang et al.

(10) Patent No.: US 8,607,351 B1
(45) Date of Patent: Dec. 10, 2013

(54) MODELING CYBERSPACE ATTACKS

(75) Inventors: Changzhou Wang, Bellevue, WA (US);
Jai Joon Choi, Sammamish, WA (US);
Mingyan Li, Redmond, WA (US);
William R. Ferng, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 476 days.

(21) Appl. No.: 12/917,966

(22) Filed: Nov. 2, 2010

(51) Int. Cl.
*G06F 11/00* (2006.01)

(52) U.S. Cl.
USPC .................. 726/25; 726/22; 726/23; 726/24

(58) Field of Classification Search
USPC ........................... 726/22, 23, 24, 25
See application file for complete search history.

(56) References Cited

U.S. PATENT DOCUMENTS

| | | | | |
|---|---|---|---|---|
| 6,931,540 | B1* | 8/2005 | Edwards et al. | 713/188 |
| 2005/0240999 | A1* | 10/2005 | Rubin et al. | 726/22 |
| 2005/0251862 | A1* | 11/2005 | Talvitie | 726/24 |
| 2007/0053382 | A1* | 3/2007 | Bevan et al. | 370/469 |
| 2009/0328185 | A1* | 12/2009 | Berg et al. | 726/13 |

OTHER PUBLICATIONS

Moore et al., "Attack Modeling for Information Security and Survivability", Mar. 2001, survivable systems, Technical Note, CMU/SEI-2001-TN-001, pp. 1-31.
Camtepe et al., "A Formal Method for Attack Modeling and Detection" TR-06-01, Rensselaer Polytechnic Institute, Computer Science Department, Jan. 2006, pp. 1-17.
CAPEC Common Attack Pattern Enumeration and Classification—a Community Knowledge Resource for Building Secure Software, 1 page, retrieved Sep. 14, 2010 htt;://capec.mitre.org/.
CAPEC.mitre.org/data/xsd/ap_schema_, pp. 1-73, retrieved Sep. 14, 2010 CAPEC.mitre.org/.../ap_schema_v2.0.xsd.
Cheung et al., "Modeling Multistep Cyber Attacks for Scenario recognition", 2003, IEEE, Proceedings of the Third DARPA Information Survivability Conference and Exposition (DISCEX III), Washington DC, Apr. 22-24, 2003, vol. 1 pp. 284-292.
Jurgenson et al., "Serial Model for Attack Tree Computations", pp. 1-13, retrieved Oct. 7, 2010 http://research.cyber.ee/~jan/publ/serialattack.pdf.

* cited by examiner

*Primary Examiner* — Teshome Hailu
(74) *Attorney, Agent, or Firm* — Yee & Associates, P.C.

(57) ABSTRACT

A method, apparatus, and computer program product for generating a model. A set of actions associated with a control flow of a set of attack patterns using non-deterministic controls is described to form a control block. A set of ontology references associated with the set of attack patterns is identified. The model is generated and it comprises the control block and the set of ontology references.

25 Claims, 10 Drawing Sheets

MODELING CYBERSPACE ATTACKS

BACKGROUND INFORMATION

1. Field

The present disclosure relates generally to data processing systems and, in particular, to a method, computer program product, and apparatus for data processing system security. Still more particularly, the present disclosure relates to a method, computer program product, and apparatus for semantically modeling cyberspace attacks.

2. Background

Cyberspace security refers to the processes and mechanisms used to deter, detect, counter, and mitigate cyber-attacks on computers and networks. Cyberspace security may also be referred to as cyber security, information systems security, and computer network security.

A cyber-space attack may be any type of actions for the purpose of disrupting, damaging, tampering, or obtaining un-authorized access to a network data processing system. Cyber-attacks may include, without limitation, a virus, worm, Trojan, malware, spyware, bots, spoofing, pharming, ping sweeps, email spamming, page hijacking, pop-ups, or any of numerous other un-authorized activities associated with a computer or network.

Currently, it is more challenging than ever before to create adequate levels of cyberspace security for protecting software and networked systems due to the increasing size and complexity of software and network systems. In addition, today's attackers have the resources of the entire Internet at their disposal. They may easily gain knowledge through tutorials, cheat sheets, and in-depth discussion from hacker forums. They may also download or otherwise obtain various attack tools easily from web sites, peer-to-peer network, or through emails. Thus, the numbers and sophistication of these attackers continues to increase.

Internet anonymity techniques created to address privacy concerns may also be leveraged by attackers to hide their identities and attack paths. Sophisticated attackers are able to discover new vulnerabilities from widely used software and launch zero-day attacks. As used herein, the term "zero-day attack" refers to the first time a particular attack is launched or a first instance of a particular attack being detected. These attackers typically only have to find a single vulnerability within software to launch an attack.

Therefore, it would be advantageous to have a method, computer program product, and apparatus that takes into account one or more of the issues discussed above, as well as other issues.

SUMMARY

In one advantageous embodiment, a method is provided for generating a model. A set of actions associated with a control flow of a set of attack patterns using non-deterministic controls is described to form a control block. A set of ontology references associated with the set of attack patterns is identified. The model is generated. The model comprises the control block and the set of ontology references.

In another advantageous embodiment, a computer program product for generating a model is provided. The computer program product includes a computer recordable storage medium. The computer readable storage medium includes program code stored on the computer recordable storage medium for describing a set of actions associated with a control flow of a set of attack patterns using non-deterministic controls to form a control block. The computer readable storage medium includes program code stored on the computer recordable storage medium for identifying a set of ontology references associated with the set of attack patterns. The computer readable storage medium includes program code stored on the computer recordable storage medium for generating the model, wherein the model comprises the control block and the set of ontology references.

In yet another advantageous embodiment, a data processing system for generating a model is provided. The data processing system includes a storage device containing program code and a processor unit. The processor unit is configured to execute the program code to describe a set of actions associated with a control flow of a set of attack patterns using non-deterministic controls to form a control block; identify a set of ontology references associated with the set of attack patterns; and generate the model, wherein the model comprises the control block and the set of ontology references.

In still another advantageous embodiment a data structure residing on a tangible computer recordable medium for modeling a cyberspace attack pattern is provided. The data structure includes a model. The model includes a control block describing a set of actions in a control flow of an attack pattern; a set of ontology references; a set of temporal constraints associated with the set of actions; and a probability that the control block corresponds with the attack pattern.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
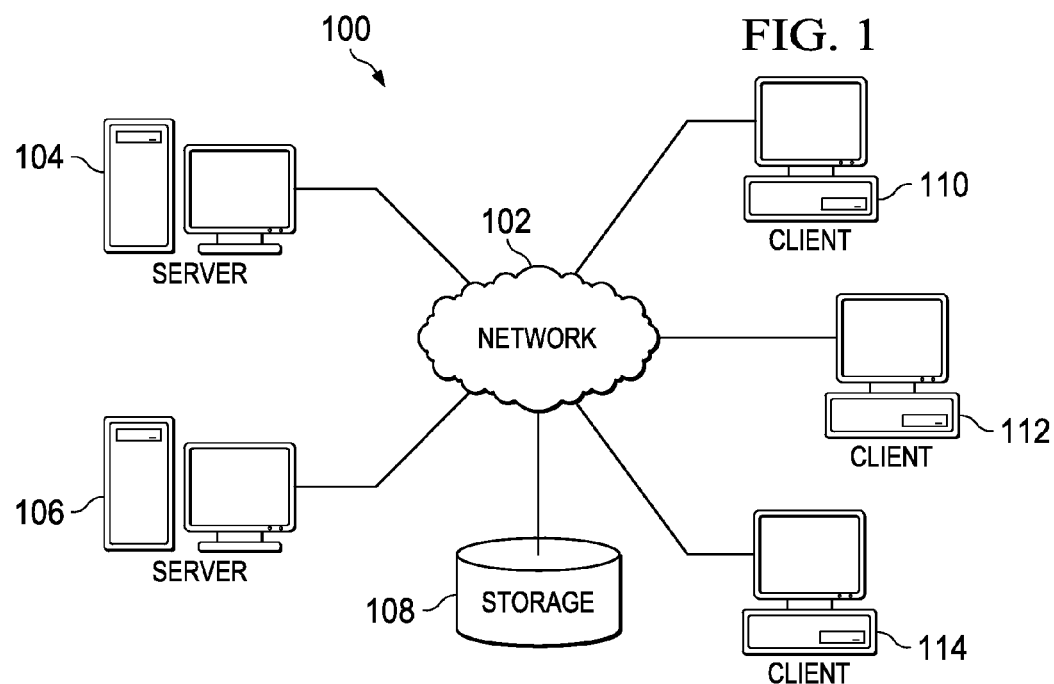
FIG. 1 is an illustrative diagram of a network data processing environment in which an advantageous embodiment may be implemented.

With reference now to the figures and in particular with reference to FIG. 1, an illustrative diagram of a network data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 may be utilized to semantically model cyberspace attacks.

Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

The different advantageous embodiments recognize and take into account a number of different considerations. For example, the different advantageous embodiments recognize and take into account that a data processing system network defense against cyberspace attacks requires real-time attack detection and implementation of meaningful counter-measures that preserve mission sustainability. The different advantageous embodiments also recognize that even though cyberspace attacks frequently follow well-known patterns, the defense operations are often human centered and labor intensive due to the lack of mechanisms to incorporate human knowledge and the lack of machine friendly implementations.

The different embodiments recognize that human analysts, equipped with cyberspace security domain knowledge and experience are typically good at analyzing small amounts of data, but frequently have difficulty when the data volume becomes large. The different advantageous embodiments also recognize and take into account that computer algorithms have challenges in leveraging cyberspace security domain knowledge for in-depth analysis of attack data.

Traditionally, cyberspace attacks are modeled using attack trees. The advantageous embodiments recognize that these attack tree models are often over-simplified as they are used for reliability analysis.

The advantageous embodiments also recognize that it might be possible to model attack patterns in an ontology language, such as Web Ontology Language (OWL) or Web Ontology Language 2 (OWL2). However, an attack usually involves a flow of actions. The embodiments recognize that current ontology languages do not provide built-in support for control flows associated with a flow of actions.

The advantageous embodiments also recognize that an attack pattern describes a category of attacks or series of actions, instead of a single attack incident. As a result, current ontology languages may not provide exact or full information about how an attack is carried out. For example, the embodiments recognize that some steps in an attack pattern may be executed in arbitrary order, or some steps may be optional. Current ontology languages do not have native support for expressing the uncertainty inherent in the nature of attack patterns associated with cyberspace attacks.

Therefore, the different advantageous embodiments provide a method, computer program product, and apparatus for generating a semantic model. In one embodiment, a set of actions associated with a control flow of an attack pattern using non-deterministic controls is described to form a control block. As used herein, the term "set" refers to one or more items, unless defined otherwise.

In this example, the set of actions is a set of one or more actions. The term "control flow" refers to a flow of a series of actions associated with a cyberspace attack pattern. Non-deterministic controls may be logic including steps or items that may be executed in any order. For example, a non-deterministic control may be a choice of one action from a given list of actions, any permutation of a list of actions, and/or parallel execution of a list of actions. Thus, the control block specifies the actions associated with a given attack pattern.

A set of ontology references associated with the control block is identified. An ontology is a formal representation of knowledge by a set of concepts within a domain and the relationships between those concepts. The set of ontology references may include references to one or more different, external ontologies.

A set of temporal constraints associated with the set of actions in the control block is created. A probability that the control block corresponds with the attack pattern is identified. A probability may include a coverage probability, a confidence rating, and/or a set of atomic action probabilities.

The semantic model is generated using the control block, the set of ontology references, the set of temporal constraints, and/or the probability.

In another embodiment, the probability includes a coverage probability. The coverage probability is an overall probability that all the attacks on a data processing system associated with an intended category of attack patterns are described by the set of actions associated with the control flow described in the control block. The intended category is a category of attack patterns identified through referencing to an ontology class of attack patterns.

In another embodiment, the probability includes a confidence rating. A confidence rating may be an overall probability that all the attacks on a data processing system associated with an intended category of attack patterns match the set of actions associated with the control flow described in the control block.

Figure 2:
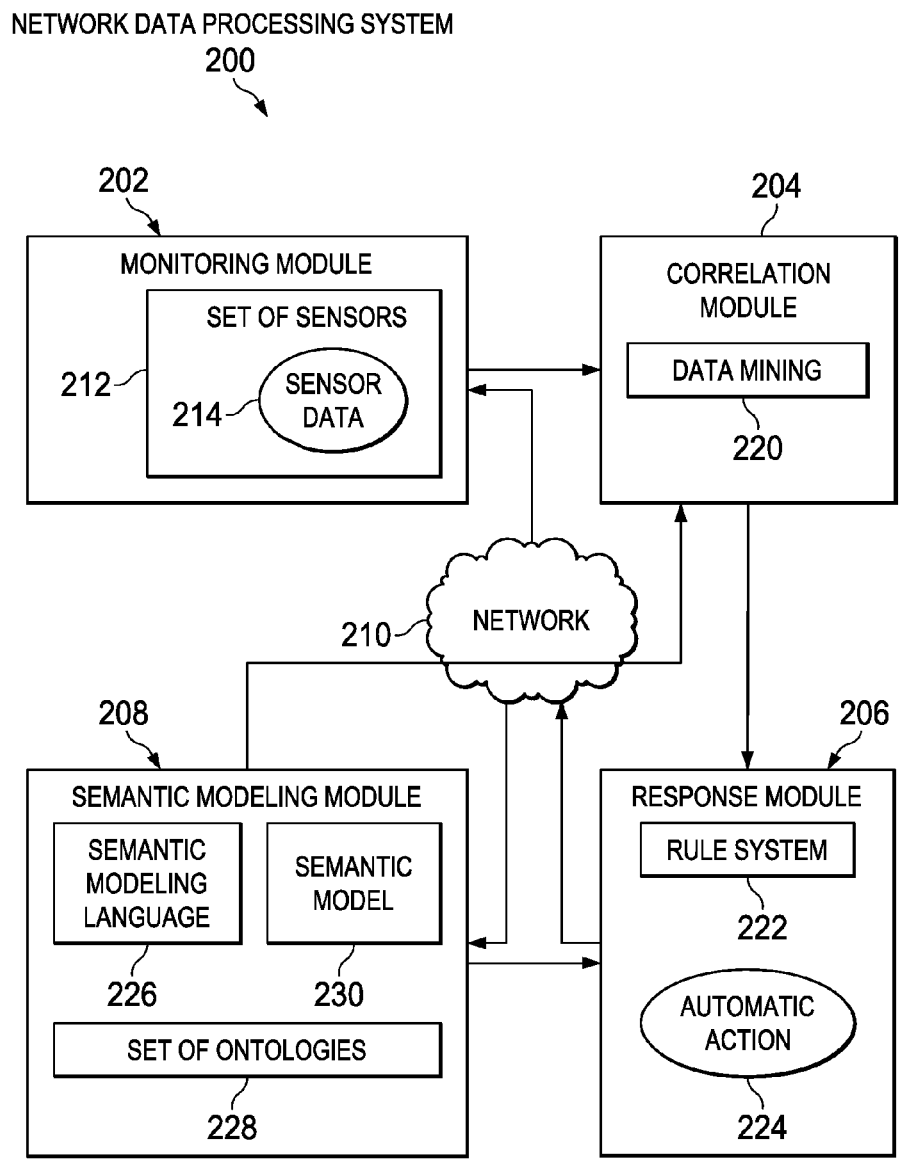
FIG. 2 is an illustration of a network data processing system modeling environment in accordance with an advantageous embodiment.

With reference now to FIG. 2, an illustration of a network data processing system semantic modeling environment is shown in accordance with an advantageous embodiment. Network data processing system 200 is a knowledge driven computer network defense system. Network data processing system 200 may be implemented using any type of networked data processing system, such as, without limitation, network data processing system 100 in FIG. 1.

Network data processing system 200 comprises monitoring module 202, correlation module 204, response module 206, and network defense modeling module 208. Monitoring module 202 provides alerts to correlation module 204, which provides high-level events to response module 206. Network defense semantic modeling module 208 provides knowledge to correlation module 204 and response module 206. Monitoring module 202 takes data from the operational network 210 and response module 206 triggers actions on the operational network 210.

Network 210 may be implemented as any type of network, including, without limitation, a local area network (LAN), a wide area network (WAN), Internet, intranet, and/or Ethernet. Network 210 may be implemented as a network such as network 102 in FIG. 2.

Monitoring module 202 comprises set of sensors 212. Set of sensors 212 is a set of one or more sensors for monitoring network traffic, system logs, data access, software interactions, system health, Internet security alerts, software vendor security bulletins, and other cyber security updates to form sensor data 214. Set of sensors 212 may include, without limitation, intrusion detection sensors, computer health sensors, and/or network health sensors.

Correlation module 204 is a software module that aggregates sensor data 214 and generates value-added information that may be used by response module 206, network defense modeling module 208, and/or human analysts. For example, and without limitation, correlation module 204 may correlate detected alerts generated by different intrusion detection sensors in set of sensors 212 to generate coarse-grain high-level attack events that span across multiple computation and communication operations or transactions. Correlation module 204 may also correlate information from other types of sensors in set of sensors 212, such as system health condition and Internet security alerts, with the detected alerts. The correlation engine may also rank alerts according to their priority so that the correlated information can help reduce the information load for the analysts. Correlation module 204 may include data mining 220.

Data mining 220 is a software component that processes data from multiple sources and identifies patterns about human and/or machine activities from these heterogeneous data sources. Data mining 220 may utilize constraint-based mining of activity patterns (CMAP) data mining framework to process data from multiple heterogeneous data sources.

Response module 206 uses rule system 222 to determine whether to execute automatic action 224 in response to a potential problem. An automatic action may be any type of pre-defined action, such as, without limitation, an action to reset a connection, block an internet protocol (IP) address, or generate an alert or notification to a human user, such as an analyst. Rule system 222 may be an ontology enriched rule system.

Semantic modeling module 208 is a software component for semantically modeling cyberspace attacks. Semantic modeling module 208 generates semantic model 230 based on a set of attacks associated with a network data processing system using semantic modeling language 226.

Semantic modeling language 226 references ontology entities and ontology statements in set of ontologies 228. Set of ontologies 228 is a set of one or more ontologies.

Semantic modeling language 226 references an ontology in set of ontologies 228 using an address, such as, without limitation, an Internationalized Resource Identifier (IRI), a Uniform Resource identifier (URI), an Internet Protocol (IP) address, or any other type of address.

Semantic modeling module 208 may generate semantic attack models that references a single ontology, as well as references to two or more different ontologies.

FIG. 2 is intended as an example, and not as an architectural limitation for the different advantageous embodiments.

Figure 3:
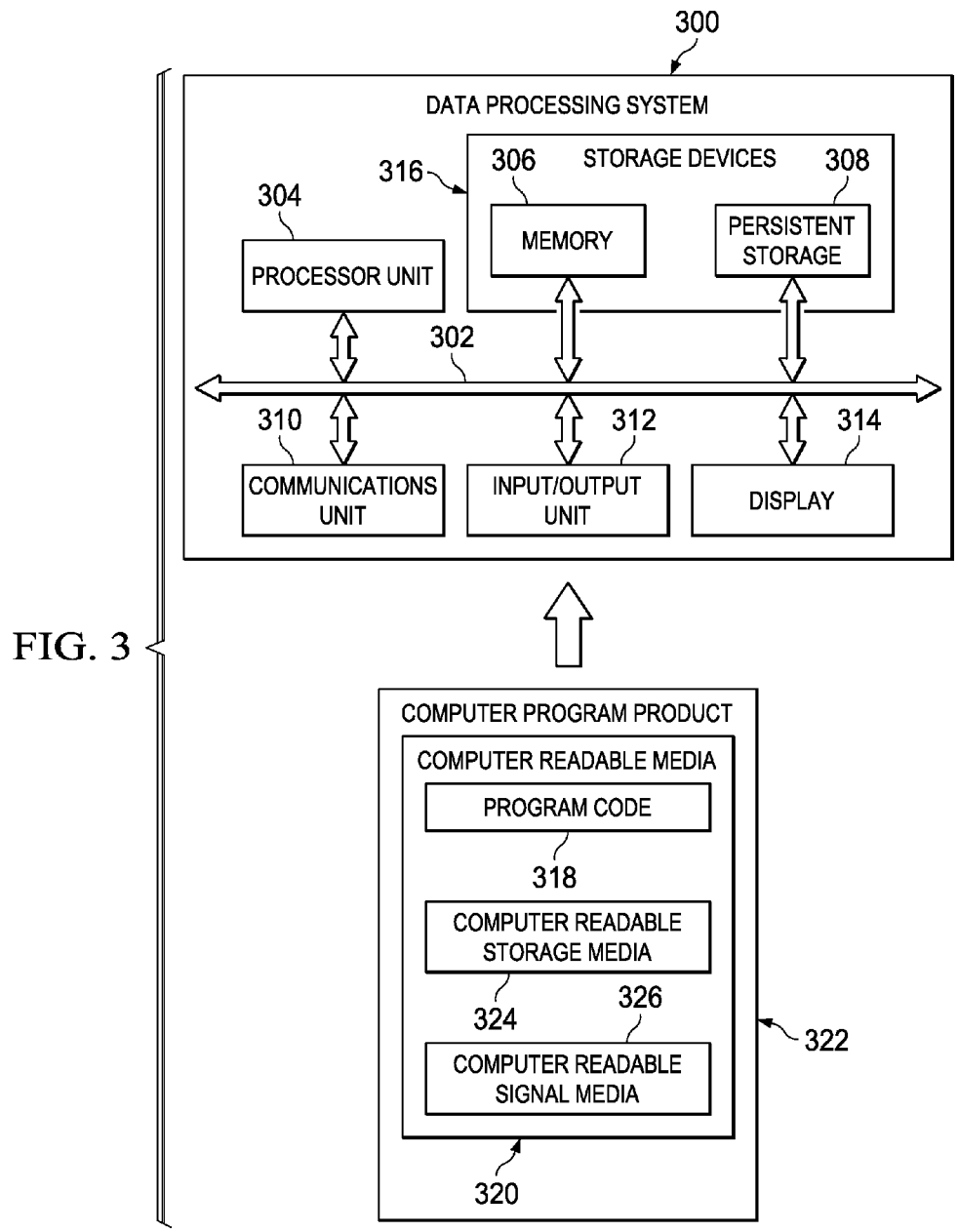
FIG. 3 is an illustration of a data processing system in accordance with an advantageous embodiment.

Turning now to FIG. 3, an illustration of a data processing system is depicted in accordance with an advantageous embodiment. Data processing system 300 may generate semantic models. Data processing system 300 may be implemented as network data processing system 100 in FIG. 1 or network data processing system 200 in FIG. 2.

In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a number of processors, a multi-processor core, or some other type of processor, depending on the particular implementation. A number, as used herein with reference to an item, means one or more items. Further, processor unit 304 may be implemented using a number of heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Storage devices 316 may also be referred to as computer readable storage devices in these examples. Memory 306, in these examples, may be, for example, a random access memory or any other suitable volatile or non-volatile storage device. Persistent storage 308 may take various forms, depending on the particular implementation.

For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322 in these examples. In one example, computer readable media 320 may be computer readable storage media 324 or computer readable signal media 326. Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory, that is connected to data processing system 300. In some instances, computer readable storage media 324 may not be removable from data processing system 300. In these illustrative examples, computer readable storage media 324 is a non-transitory computer readable storage medium.

Alternatively, program code 318 may be transferred to data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 318 may be downloaded over a network to persistent storage 308 from another device or data processing system through computer readable signal media 326 for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different advantageous embodiments may be implemented in a data processing system including components in addition to or in place of those illustrated for data processing system 300. Other components shown in FIG. 3 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 304 may take the form of a hardware unit that has circuits that are manufactured or configured for a particular use. This type of hardware may perform operations without needing program code to be loaded into a memory from a storage device to be configured to perform the operations.

For example, when processor unit 304 takes the form of a hardware unit, processor unit 304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 318 may be omitted because the processes for the different embodiments are implemented in a hardware unit.

In still another illustrative example, processor unit 304 may be implemented using a combination of processors found in computers and hardware units. Processor unit 304 may have a number of hardware units and a number of processors that are configured to run program code 318. With this depicted example, some of the processes may be implemented in the number of hardware units, while other processes may be implemented in the number of processors.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306, or a cache, such as found in an interface and memory controller hub that may be present in communications fabric 302.

FIG. 3 is intended as an example, and not as an architectural limitation for the different advantageous embodiments.

Figure 4:
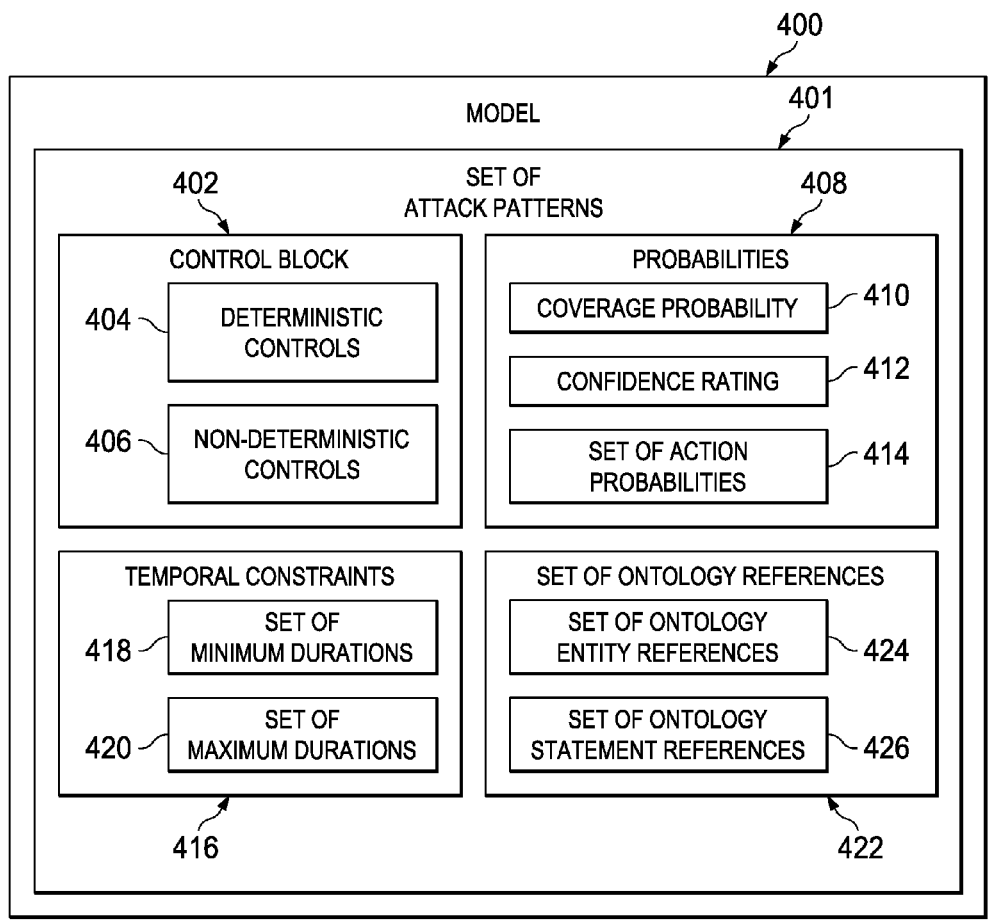
FIG. 4 is an illustration of a semantic model in accordance with an advantageous embodiment.

FIG. 4 is an illustration of a semantic model in accordance with an advantageous embodiment. Model 400 is a model of set of attack patterns 401 associated with a given cyberspace attack. Model 400 is created using a modeling language, such as semantic modeling language 226 in FIG. 2. The semantic modeling language may be an extensible markup language (XML) based language.

Model 400 includes control block 402. Control block 402 is a model of a rich set of control flows describing the partial or non-deterministic workflow of actions associated with an actual or potential cyber-space attack.

Control block 402 also comprises deterministic controls 404. Deterministic controls 404 include, without limitation, at least one of a conditional branch, conditional repeat, and/or loop over items of a given list. An example of a conditional branch is an "if . . . then . . . else" statement.

Further, as used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Control block 402 also comprises logic for modeling non-deterministic controls 406. Non-deterministic controls 406 comprise steps or items that may be executed in any order. For example, a non-deterministic control may be a choice of one action from a given list of actions, any permutation of a list of actions, and/or parallel execution of a list of actions. Thus, if a non-deterministic control includes items A and B, the actions may be executed in the order of A and then B or in the order of B and then A.

Model 400 may incorporate probabilities 408 in specifying each attack pattern. Probabilities 408 may be probabilities from the view of subjectivism or Bayesian statistics. Probabilities 408 may be a customized discrete probability distribution for a given attack. Probabilities 408 may be defined with a table of values and the corresponding probabilities for those values.

Probabilities 408 may include coverage probability 410. Coverage probability 410 may be a probability that all the attacks of the intended category as specified in an ontology are described by the flow of actions specified in the attack pattern. In other words, a given ontology may group one or more attack patterns in an intended category. The coverage probability 410 identifies a probability that the control block accurately describes the attacks within the intended category of the given ontology.

Confidence rating 412 may also be a probability that the flow of actions specified in the attack pattern matches all the attacks of the intended category as specified in an ontology.

Probabilities 408 may also include set of action probabilities 414. Set of action probabilities 414 is a set of one or more probability specification(s) for each atomic action or complex action to be taken in launching a particular attack.

An atomic action is defined by a simple control block that is not further divided. In other words, an atomic action does not include any nested control blocks. An example of an atomic action may be a "wait for data" action. A complex action includes multiple control blocks that may be nested.

Model 400 may include temporal constraints 416. Temporal constraints 416 support the temporal constraints on the actions in an attack pattern.

Temporal constraints 416 may include set of minimum durations 418. A minimum duration in set of minimum durations 418 is an optional overall minimum duration for a complex action and/or a minimum duration for a wait action.

Temporal constraints 416 may include set of maximum durations 420. A maximum duration in set of maximum durations 420 is an optional overall maximum duration for a complex action and/or a maximum duration for a wait action.

Model 400 may include set of ontology references 422. An ontology reference may include set of ontology entity references 424 and/or set of ontology statement references 426. Set of ontology entity references 424 may be a set of references to ontology classes, properties and/or individuals.

Set of ontology references 422 may be utilized to avoid redundant specification of knowledge that is already available in the computer network ontologies, such as set of ontologies 228 in FIG. 2. The ontology references may be human readable references, as well as machine readable references.

FIG. 4 is intended as an example, and not as an architectural limitation for the different advantageous embodiments.

Figure 5:
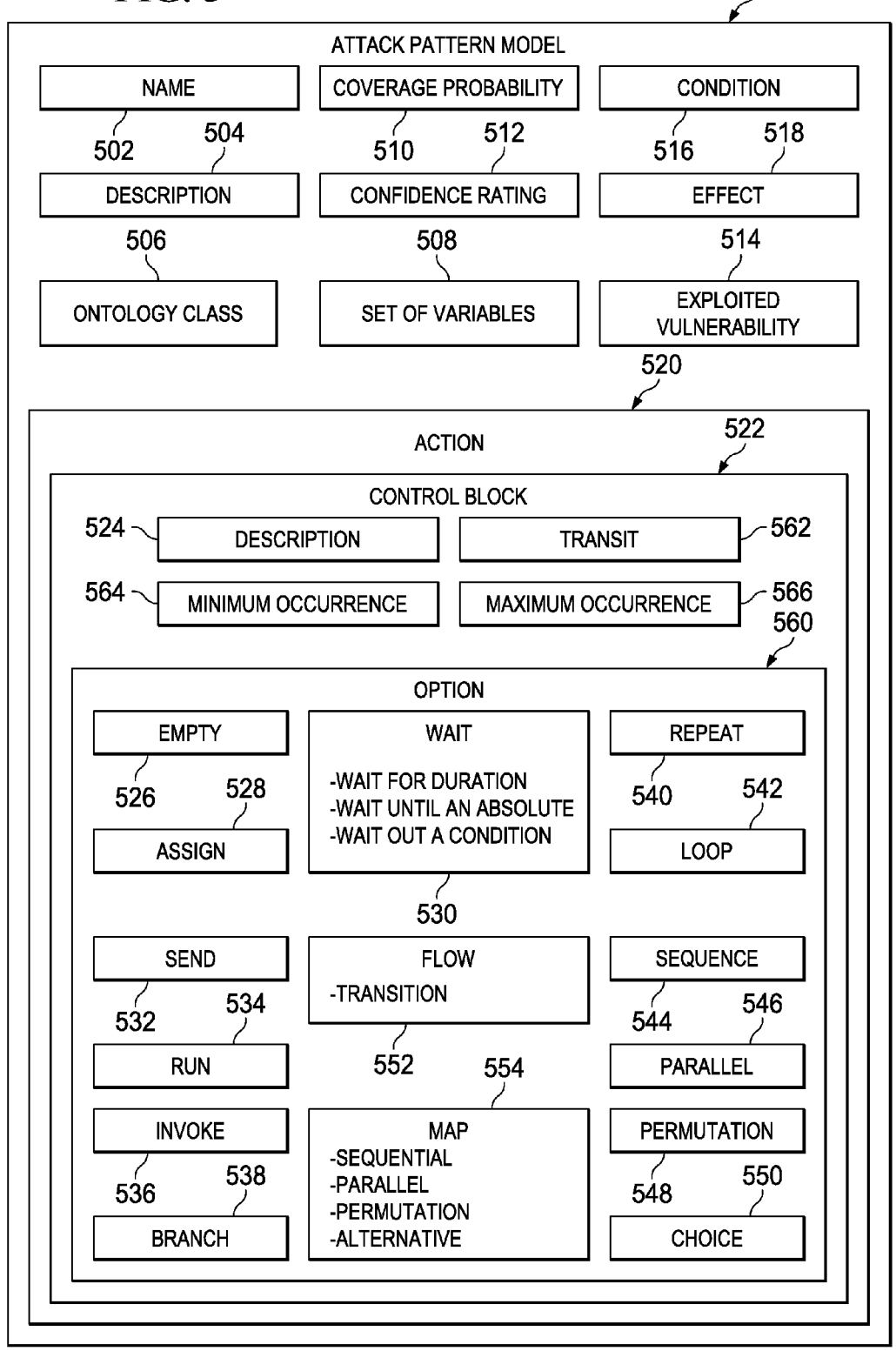
FIG. 5 is an illustration of a semantic attack pattern model in accordance with an illustrative embodiment.

FIG. 5 is an illustration of a semantic attack pattern model in accordance with an illustrative embodiment. Attack pattern model 500 is a semantic model of a single attack pattern.

Attack pattern model 500 includes a name 502 and description 504 of the actions associated with the attack pattern. Attack pattern model 500 may include references to ontology class 506. Ontology class 506 identifies the intended category that the attack model is created to describe. Ontology class 506 is an example entry of set of ontology entity references 424.

Attack pattern model 500 may include a coverage probability 510 and a confidence rating 512 for the attack pattern. Coverage probability 510 is the subjective/estimated probability that all the attacks of the intended category are described by the flow of actions specified in the attack pattern. Confidence rating 512 describes the probability that the flow of actions specified in the attack pattern matches all the attacks of the intended category.

Exploited vulnerability 514 is a description of vulnerabilities in the target system exploited by the given attack pattern. Each vulnerability is identified by referencing to an ontology class via an address, such as an International Resource Identifier or other address type.

Condition 516 is a Boolean expression describing the state of the data processing system before the attack pattern is launched. Effect 518 is a Boolean expression describing the state of the data processing system after the attack pattern is launched.

Action 520 is a description of a set of deterministic or non-deterministic control blocks associated with the attack pattern, such as control block 402 in FIG. 4. Set of Variables 508 is a set of named variables that are referenced by condition 516, effect 518 and action 520.

Action 520 may be an atomic action with a simple control block or a complex action with a flow of a set of control blocks. Each control block 522 has a description 524. Description 524 is a description of the purpose or function of the action. Each control block 522 has one of the control block option 560. A control block option 560 can be an empty 526, an assign 528, a wait 530, a send 532, a run 534, an invoke 536, a branch 538, a repeat 540, a loop 542, a sequence 544, a parallel 546, a permutation 548, a choice 550, a flow 552, and a map 554. Each control block 522 may have one or more transit 562 to support synchronization of multiple control blocks nested inside a complex control block flow 552. Each control block 522 has an optional minimum occurrence 564 to specify the minimum number of times to repeat the control block. Each control block 522 also has an optional maximum occurrence 566 to specify the maximum number of times to repeat the control block.

Empty 526 refers to a lack of action. Empty 526 is a description that may be used for synchronization purposes or used as a filler.

Assign 528 refers to an action assigning a value to a variable. The value is the result of evaluating an expression. The expression may reference to other variables. New variables may be introduced by this construct, and scoped to a containing block associated with assign 528.

Wait 530 refers to an action that waits for a minimum duration of time, waits for a maximum duration of time, waits until an absolute deadline, and/or waits until a condition occurs, such as, without limitation, wait until the condition expression evaluates to false.

Send 532 describes an action to send a message from a first computing node to a second node.

Run 534 is a run command on a computing node with command line arguments whose values may be constructed from variable values.

Invoke 536 is an action executed by a first attack pattern that invokes a second attack pattern with parameters whose values may be constructed from variable values in the first attack pattern.

Branch 538 is an action based on the evaluation of a condition expression, such as a Boolean expression. Based on the evaluation of a condition, the action executes one of two possible branches. Branch 538 may include the if-then-else construct in many programming languages. Each branch may include multiple nested control blocks. The nested control blocks are executed in sequential order.

Repeat 540 repeats execution of an expression. For example, repeat 540 may be a "When", "Until" or "Do-while" expression. In such case, the logic first evaluates the "When" condition, if true, the logic executes the set of nested control blocks following the when condition sequentially. If the "When" condition is false, the logic repeats the evaluation of the "When" condition and so on.

Loop 542 executes a set of nested control blocks following a list declaration sequentially for each item in the list. The items are selected one by one sequentially according to their positions in the list in ascending order. The nested control blocks can refer to the item by treating the list iterator as a variable. The iterator variable is scoped in this loop control block and any of its nested control blocks.

Sequence 544 executes a set of nested control blocks sequentially. Parallel 546 executes a set of nested control blocks in parallel. Permutation 548 executes a set of nested control blocks in any permutation order.

Sequence 544, parallel 546, and permutation 548 may include an attribute of minimum branch and an attribute of maximum branch. If a minimum and/or maximum branch attribute is specified for a particular action, a non-deterministically selected subset of the nested control blocks is executed where the number of the nested control blocks in the subset is between the minimum and/or maximum branch specified.

Sequence 544, parallel 546, and permutation 548 may include a minimum duration attribute or a maximum duration attributed. If a minimum and/or maximum duration is specified, the execution of the particular action is finished within the constraint duration.

Choice 550 executes one non-deterministically selected control block from all its nested control blocks.

Flow 552 executes a set of nested control blocks in a partial order. The partial order is determined by the transition specifications in the flow control block and transit 562 in some of nested control blocks inside flow 552.

Flow 552 may comprise a transition identifier. The transition identifier may be referenced in a pair of transit 562 that may be specified in two of the nested control blocks of flow 552, such as, without limitation, "control block A" and "control block B". In this example, a first transit inside control block A specifies A as the source of a transition and a second transit inside control block B specifies B as the target of the same transition. Transit 562 may also specify a condition such that B may not be executed until both A has been executed and the specified condition is met.

Flow 552 may also specify a minimum duration attribute and/or a maximum duration attribute. A minimum duration and/or maximum duration may be specified to constrain the overall execution of elements in flow 552.

Map 554 executes a set of nested control blocks associated with map 554. The nested control blocks are executed sequentially following a list declaration. The child controls may refer to an item in a list by treating the list iterator as a variable.

Map 554 may also be associated with a type attribute. The type attribute may take a value, such as, without limitation, sequential, parallel, permutative, and alternative. The items in the list are selected and the nested control blocks are executed sequentially for each item in the list. If the type attribute is sequential, list items are selected sequentially and the nested control blocks are executed repeatedly for each item. If the type attribute is parallel, the list items are selected at the same time and the nested control blocks are executed in multiple parallel threads wherein each thread will use one of the list items.

In another example, if the type attribute is permutative, the list items are selected in an arbitrary order and the nested control blocks are executed repeatedly for each item. In another embodiment, if the type attribute is alternative, one of the list of items is non-deterministically selected and the nested control blocks are executed for that item.

In addition, a non-deterministically selected subset of items may be selected where the number of items is constrained by a minimum branch and/or maximum branch attribute. A minimum duration and/or maximum duration attribute may also be specified to constrain overall execution of control blocks associated with map 554.

FIG. 5 is intended as an example, and not as an architectural limitation for the different advantageous embodiments.

Figure 6:
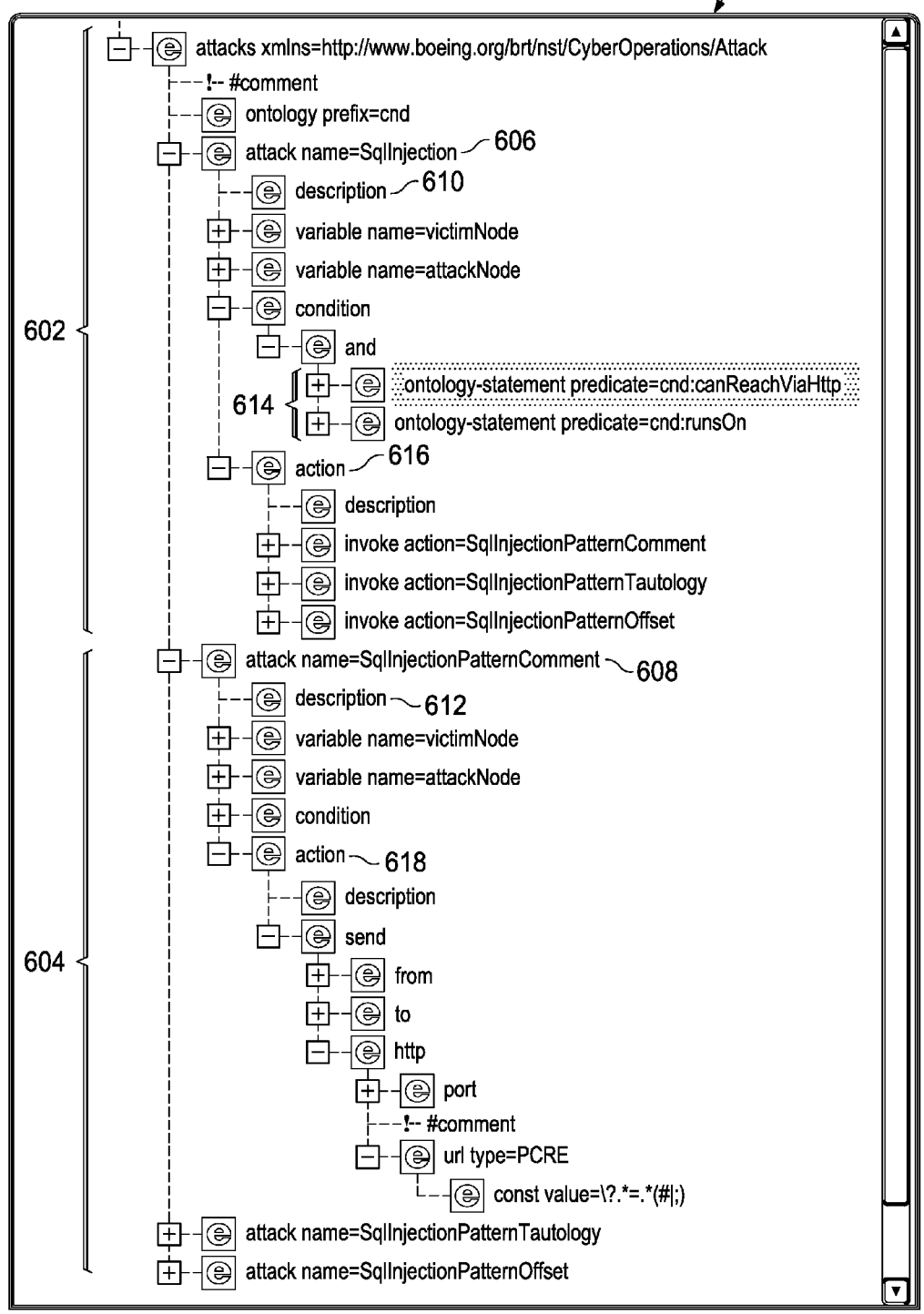
FIG. 6 is an illustration of semantic model attack pattern in accordance with an illustrative embodiment.

FIG. 6 is an illustration of a model attack pattern in accordance with an illustrative embodiment. Model 600 is a model schema for a set of attack patterns, such as, without limitation, semantic model 230 in FIG. 2 and model 400 in FIG. 4. Model 600 is shown in an extensible markup language format.

Model 600 includes a description of a set of attack patterns. The set of attack patterns in Model 600 may include a single attack pattern, as well as two or more attack patterns. As shown here, Model 600 comprises attack patterns 602 and 604.

Each attack pattern includes a name within the namespace of the attack model, such as, without limitation, attack pattern names 606 and 608. Each attack pattern includes a description of the attack, such as, but without limitation, description 610 and 612.

Set of ontology statement references 614 is a set of addresses to a set of ontology statements. Each attack pattern model may include references to one or more ontology statements and/or ontology entities.

Each attack pattern includes a description of action associated with the attack pattern, such as, without limitation action 616 and 618.

FIG. 6 is intended as an example, and not as an architectural limitation for the different advantageous embodiments.

Figure 7:
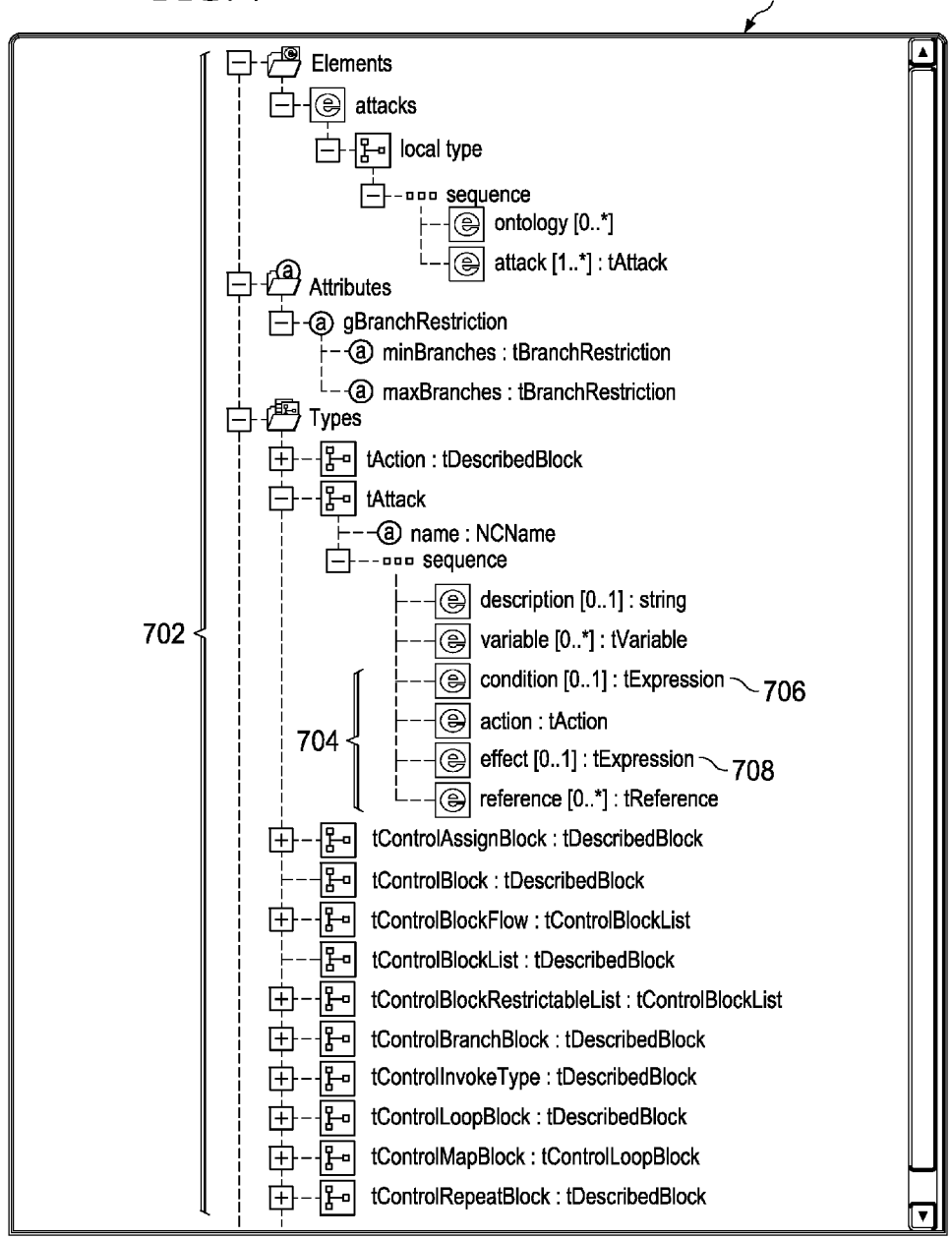
FIG. 7 is an illustration of a modeling language schema with attributes in accordance with an advantageous embodiment.

FIG. 7 is an illustration of a modeling language schema with attributes in accordance with an advantageous embodiment. Modeling language schema 700 is an extensible markup language schema for a modeling language.

Modeling language schema 700 identifies attributes 702 of an attack pattern, such as, without limitation, condition 706 and effect 708. Condition 706 may be, without limitation, a condition to be met before a cyberspace attack. Effect 708 may be, without limitation, an effect to achieve after a cyberspace attack.

Figure 8:
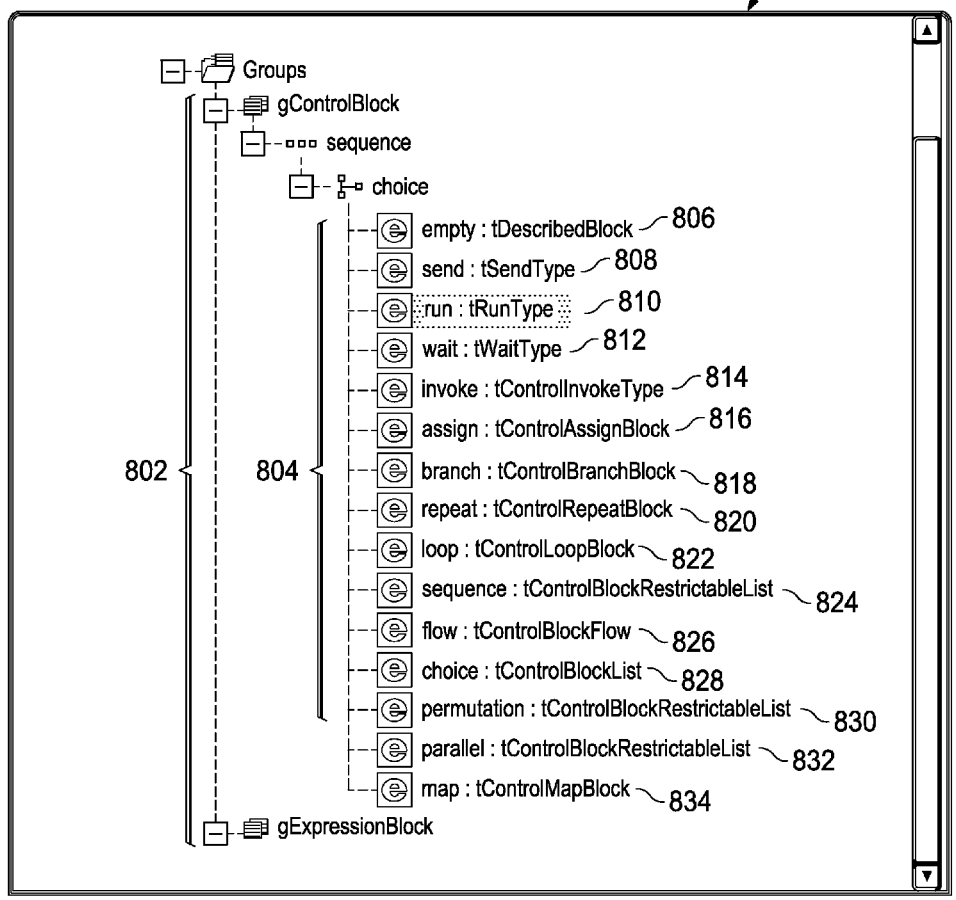
FIG. 8 is an illustration of a modeling language schema of a control block in accordance with an advantageous embodiment.

Referring now to FIG. 8, an illustration of a modeling language schema of a control block is shown in accordance with an advantageous embodiment.

Modeling language schema 800 identifies control block 802 having a set of options 804. In this example, the set of options 804 includes, without limitation, empty 806, send 808, run 810, wait 812, invoke 814, assign 816, branch 818, repeat 820, loop 822, sequence 824, flow 826, choice 828, permutation 830, parallel 832, and map 834.

Map 834 refers to a control in a control block that executes a set of child control block elements in a list sequentially. Map 834 may be a map control such as, without limitation, map 554 in FIG. 5.

Figure 9:
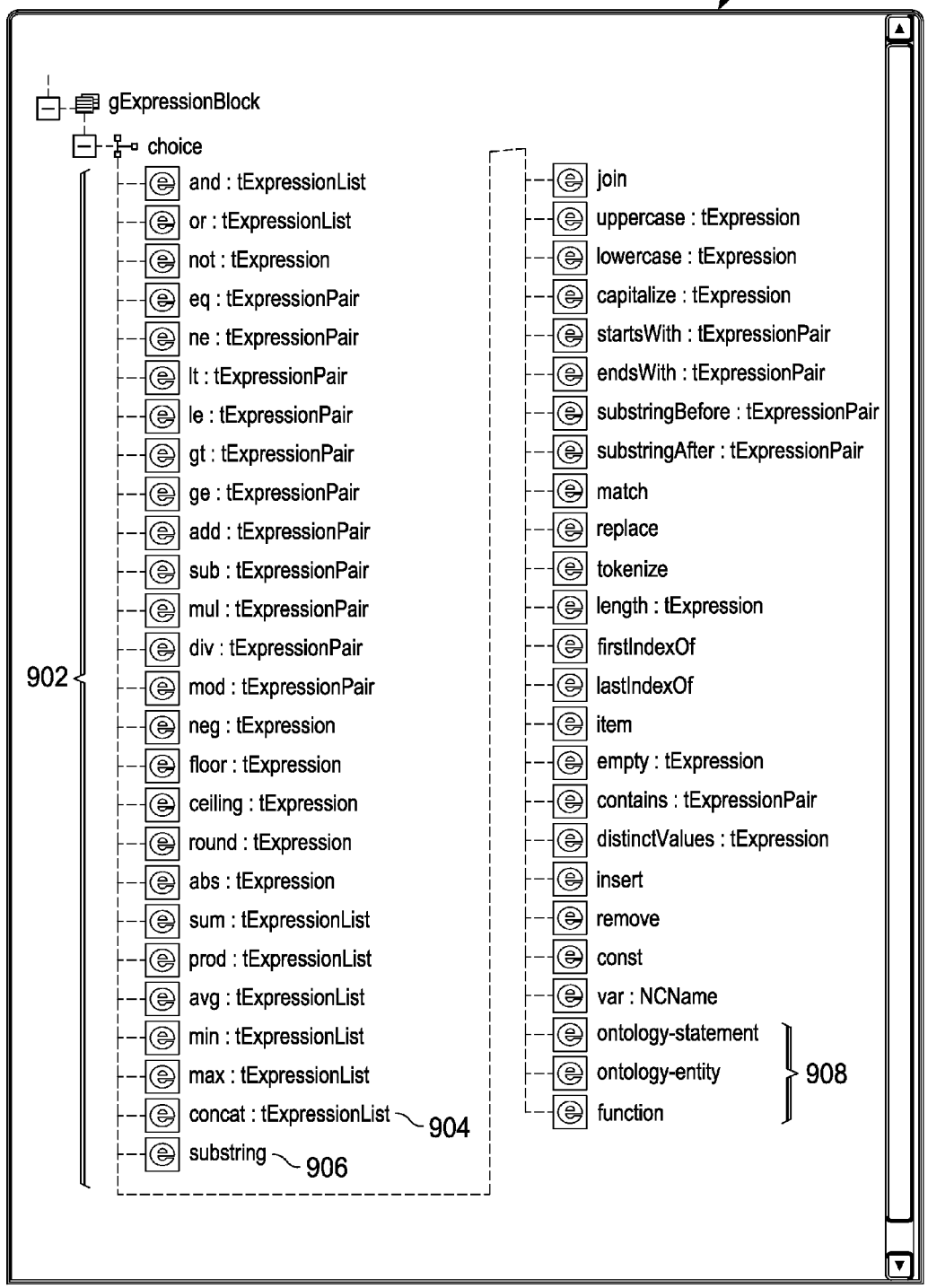
FIG. 9 is an illustration of a modeling language schema of expression constructs used in an attack pattern in accordance with an illustrative embodiment.

FIG. 9 is an illustration of a modeling language schema of expression constructs used in an attack pattern in accordance with an illustrative embodiment. Modeling language schema 900 may include expression constructs 902. Expression constructs 902 may include operators on Boolean values, numbers and strings. For example, and without limitation, expression constructs 902 may include, such as concatenating two strings 904 and/or obtaining a substring 906.

Modeling language schema 900 also includes expression constructs for referencing ontologies 908. Expression constructs referencing ontologies 908 may include, without limitation, references to ontology statements and/or references to ontology entities.

Figure 10:
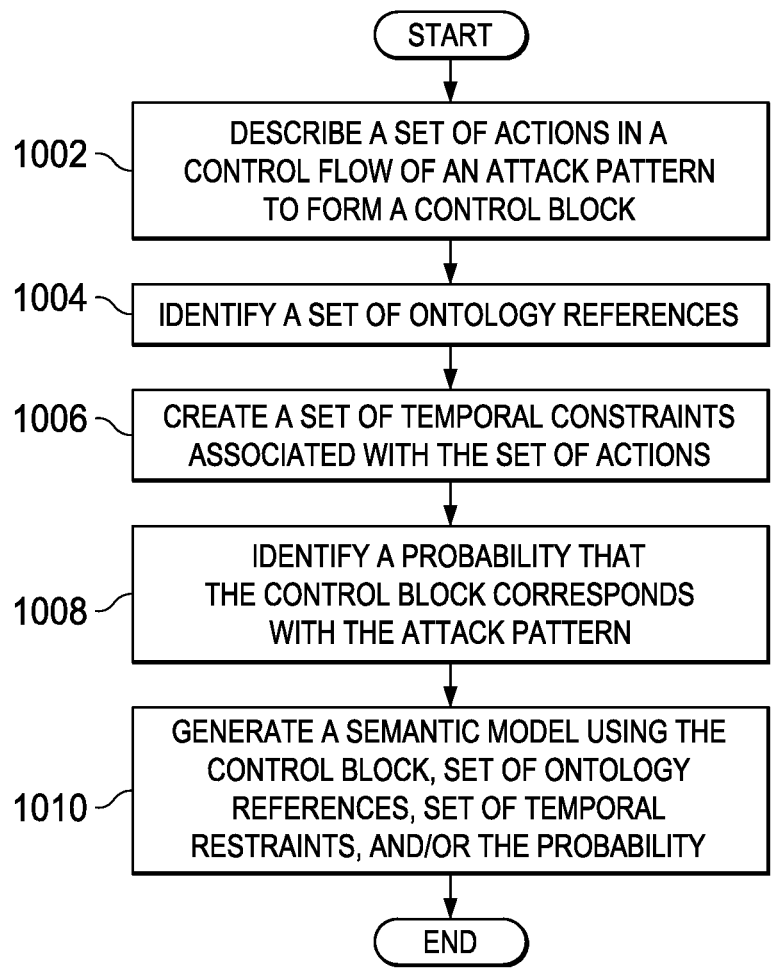
FIG. 10 is an illustration of a flowchart of a process for creating a semantic model in accordance with an advantageous embodiment.

FIG. 10 is an illustration of a flowchart of a process for creating a semantic model in accordance with an advantageous embodiment. The process in FIG. 8 may be implemented by a software component for generating attack pattern models, such as semantic modeling module 208 in FIG. 2.

The process begins by describing a set of actions in a control flow of an attack pattern to form a control block (operation 1002). A set of ontology references is identified (operation 1004). A set of temporal constraints associated with the set of actions is created (operation 1006).

A probability that the control block corresponds with the attack pattern is identified (operation 1008). A semantic model is generated using the control block, the set of ontology references, the set of temporal restraints, and/or the probability (operation 1010) with the process terminating thereafter.

In other words, the semantic model may include the control block, the set of ontology references, the set of temporal restraints, and the probability. However, in another embodiment, the semantic model may include only the control block, the set of ontology references, and the probability. In still another embodiment, the semantic model may include the control block and the set of ontology references, or any other combination of the control block, the probability, the set of ontology references, and the set of temporal constraints.

Thus, advantageous embodiments provide a method, apparatus, and computer program product for generating sematic models. In one embodiment a set of actions associated with a control flow of a set of attack patterns using non-deterministic controls is described to form a control block. A set of ontology references associated with the set of attack patterns is identified. The semantic model is generated. The semantic model comprises the control block and the set of ontology references.

Thus, the different advantageous embodiments leverages human knowledge in the cyber defense domain without overloading human analysts and other cyber defense staff members with excessive information and without relying on heavy laborious configuration and tuning of cyber defense tools.

The cyberspace attack modeling of the advantageous embodiments also enable intuitive modeling of data processing system network attacks by human experts. The cyberspace attack models of the embodiments may also be used by computing systems to automatically defend against cyberspace attacks. The advantageous embodiments also leverage the content-rich human knowledge accumulated in cyberspace represented in the form of ontologies for detecting and defending against cyberspace attacks. In other words, the embodiments may leverage human knowledge to enhance machine-based solutions.

The advantageous embodiments may also model the cyber defense environment of a data processing system, a set of attack patterns, and a set of response patterns using a network defense modeling language that is both machine understandable for automating cyber defense actions and human understandable for easy knowledge elicitation, capture, reuse, and integration by human users.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating a semantic model of a cyberspace attack, the method comprising:
    describing, by a processor unit, a set of actions associated with a control flow of a set of attack patterns using non-deterministic controls to form a control block, wherein each of the attack patterns in the set of attack patterns describes a category of cyberspace attacks and wherein each of the non-deterministic controls comprises logic steps executed in an order decided at run time;
    identifying, by the processor unit, a set of ontology references associated with the set of attack patterns, wherein the set of ontology references comprises a reference to an ontology and wherein the ontology represents knowledge with a set of concepts and relationships between concepts in the set of concepts;
    generating, by the processor unit, the semantic model of the cyberspace attack, wherein the semantic model of the cyberspace attack comprises the control block and the set of ontology references and wherein the semantic model of the cyberspace attack is represented with a semantic modeling language; and
    creating, by the processor unit, a set of temporal constraints associated with the set of actions in the control block, wherein each temporal constraint in the set of temporal constraints is selected from the group consisting of a set of minimum time durations and a set of maximum time durations.

2. The method of claim 1:
    wherein the semantic model of the cyberspace attack comprises the control block, a probability, and the set of temporal constraints.

3. The method of claim 1 further comprising:
    identifying a probability that the control block corresponds with the set of attack patterns, wherein the semantic model of the cyberspace attack comprises the control block, the probability, and the set of ontology references.

4. The method of claim 3, wherein the probability further comprises a coverage probability, wherein the coverage probability is an overall probability that all attacks on a data processing system associated with an intended category of attack patterns are described by the set of actions associated with the control flow described in the control block.

5. The method of claim 3 wherein, the probability further comprises a confidence rating, wherein the confidence rating identifies an overall probability that all attacks on a data processing system associated with an intended category of attack patterns are described by the set of actions associated with the control flow described in the control block.

6. The method of claim 3 wherein, the probability further comprises a confidence rating, wherein the confidence rating identifies an overall probability that all attacks on a data processing system associated with an intended category of attack patterns match the set of actions associated with the control flow described in the control block.

7. The method of claim 1 wherein, the set of actions described in the control block comprises a set of atomic actions, wherein the set of atomic actions comprises at least one of an empty, an assign, a wait, a send, a run, and an invoke.

8. The method of claim 1 wherein, the set of actions described in the control block comprises a set of complex actions, wherein the set of complex actions comprises at least one of a branch, repeat, flow, loop, sequence, parallel, permutation, choice, and map.

9. The method of claim 1 wherein, the set of actions described in the control block comprises a set of attributes for an action, and wherein the set of attributes for the action comprises at least one of a minimum duration, a maximum duration, a minimum branch, a maximum branch.

10. The method of claim 1 wherein, the set of ontology references further comprises at least one of a set of ontology entity references and a set of ontology statement references.

11. The method of claim 1 wherein, the semantic model of the cyberspace attack further comprises at least one of a description of an exploited vulnerability, a condition to be met before a cyberspace attack, an effect to achieve after the cyberspace attack, a set of variables to be referenced in the set of actions, the condition, and the effect.

12. A computer program product for generating a semantic model of a cyberspace attack, the computer program product comprising:
    a non-transitory computer recordable storage medium;
    program code, stored on the non-transitory computer recordable storage medium, for describing a set of actions associated with a control flow of a set of attack patterns using non-deterministic controls to form a control block, wherein each of the attack patterns in the set of attack patterns describes a category of cyberspace attacks and wherein each of the non-deterministic controls comprises logic steps executed in an order decided at run time;
    program code, stored on the non-transitory computer recordable storage medium, for identifying a set of ontology references associated with the set of attack patterns, wherein the set of ontology references comprises a reference to an ontology and wherein the ontology represents knowledge with a set of concepts and relationships between concepts in the set of concepts; and program code, stored on the non-transitory computer recordable storage medium, for generating the semantic model of the cyberspace attack, wherein the semantic model of the cyberspace attack comprises the control block and the set of ontology references and wherein the semantic model of the cyberspace attack is represented with a semantic modeling language; and program code, stored on the non-transitory computer recordable storage medium, for creating a set of temporal constraints associated with the set of actions in the control block, wherein each temporal constraint in the set of temporal constraints is selected from the group consisting of a set of minimum time durations and a set of maximum time durations.

13. The computer program product of claim 12:
wherein the semantic model of the cyberspace attack comprises the control block, a probability, and the set of temporal constraints.

14. The computer program product of claim 12 further comprising:
program code, stored on the non-transitory computer recordable storage medium, for identifying a probability that the control block corresponds with the set of attack patterns,
wherein the semantic model of the cyberspace attack comprises the control block, the probability, and the set of ontology references.

15. The computer program product of claim 14, wherein the probability further comprises a coverage probability, wherein the coverage probability is an overall probability that all attacks on a data processing system associated with an intended category of attack patterns are described by the set of actions associated with the control flow described in the control block.

16. The computer program product of claim 14, wherein the probability further comprises a confidence rating, wherein the confidence rating identifies an overall probability that all attacks on a data processing system associated with an intended category of attack patterns match the set of actions associated with the control flow described in the control block.

17. The computer program product of claim 12, wherein the set of actions described in the control block comprises a set of complex actions, wherein the set of complex actions comprises at least one of a branch, repeat, flow, loop, sequence, parallel, permutation, choice, and map.

18. The computer program product of claim 12, wherein the set of actions described in the control block comprises a set of attributes for an action, and wherein the set of attributes for the action comprises at least one of a minimum duration, a maximum duration, a minimum branch, and a maximum branch.

19. The computer program product of claim 12, wherein the set of ontology references further comprises at least one of a set of ontology entity references and a set of ontology statement references.

20. The computer program product of claim 12, wherein the semantic model of the cyberspace attack further comprises at least one of a description of an exploited vulnerability, a condition to be met before a cyberspace attack, an effect to achieve after the cyberspace attack, a set of variables to be referenced in the set of actions, the condition, and the effect.

21. A data processing system for generating a semantic model of a cyberspace attack, the data processing system comprising:
a storage device containing program code and a processor unit configured to execute the program code to:
describe a set of actions associated with a control flow of a set of attack patterns using non-deterministic controls to form a control block, wherein each of the attack patterns in the set of attack patterns describes a category of cyberspace attacks and wherein each of the non-deterministic controls comprises logic steps executed in an order decided at run time;
identify a set of ontology references associated with the set of attack patterns, wherein the set of ontology references comprises a reference to an ontology and wherein the ontology represents knowledge with a set of concepts and relationships between concepts in the set of concepts;
generate the semantic model of the cyberspace attack, wherein the semantic model of the cyberspace attack comprises the control block and the set of ontology references and wherein the semantic model of the cyberspace attack is represented with a semantic modeling language; and
create a set of temporal constraints associated with the set of actions in the control block, wherein each temporal constraint in the set of temporal constraints is selected from the group consisting of a set of minimum time durations and a set of maximum time durations.

22. The data processing system of claim 21,
wherein the semantic model of the cyberspace attack comprises the control block, a probability, and the set of temporal constraints.

23. The data processing system of claim 21, wherein the processor unit is further configured to execute the program code to identify a set of ontology references associated with the control block to form a set of ontology references within the semantic model of the cyberspace attack.

24. The data processing system of claim 21, wherein the processor unit is further configured to execute the program code to identify a probability that the control block corresponds with the set of attack patterns, wherein the semantic model of the cyberspace attack comprises the control block, the probability, and the set of ontology references.

25. A data structure residing on a non-tangible computer recordable medium for modeling a cyberspace attack pattern, the data structure comprising:
a semantic model of the cyberspace attack pattern, wherein the semantic model of the cyberspace attack pattern is represented with a semantic modeling language and comprises:
a control block describing a set of actions in a control flow of an attack pattern using a non-deterministic control, wherein the attack pattern describes a category of cyberspace attacks and wherein the non-deterministic controls comprises a set of logic steps executed in an order decided at run time;
a set of ontology references, wherein the set of ontology references comprises a reference to an ontology and wherein the ontology represents knowledge with a set of concepts and relationships between concepts in the set of concepts;
a set of temporal constraints associated with the set of actions, wherein each temporal constraint in the set of temporal constraints is selected from the group consisting of a set of minimum time durations and a set of maximum time durations; and a probability that the control block corresponds with the attack pattern.

\* \* \* \* \*